Reissued Nov. 17, 1953 Re. 23,740

UNITED STATES PATENT OFFICE 23,740

CORROSION INHIBITING COMPOSITIONS AND METHOD

John W. Ryznar, La Grange Park, and Marjorie A. Peich, Chicago, Ill., assignors to National Aluminate Corporation, Chicago, Ill., a corporation of Delaware No Drawing. Original No. 2,515,529, dated July 18, 1950, Serial No. 685,379, July 22, 1946. Application for reissue March 18, 1953, Serial No. 343,275

13 Claims. (Cl. 23—204)

Matter enclosed in heavy brackets [ ] appears in the original patent but forms no part of this reissue specification; matter printed in italics indicates the additions made by reissue.

This invention relates to new and improved corrosion inhibiting compositions and to a new and improved method of inhibiting corrosion. The invention is particularly concerned with corrosion inhibiting compositions for preventing or inhibiting underwater corrosion in systems where water is moving, as through condensers, engine jackets, spray or cooling towers, and distribution sytems. The invention is especially valuable in inhibiting corrosion of ferrous metals, including iron and steel.

It is known that various phosphates will inhibit underwater corrosion on ferrous metals under certain conditions. The dosage of the phosphate will vary depending upon such factors as the velocity of the water, the temperature and the chemical content of the water. Some phosphates are more effective than others in certain types of waters. Thus, if the water contains very much calcium the use of an orthophosphate is undesirable because the calcium phosphate scale is deposited in the pipes and tubes, thereby producing a result which may be worse than the corrosion. The corroding tendency of the water is greatly increased by the presence of sodium chloride and sodium sulfate. As the velocity of the water increases the dosage of phosphate required to inhibit corrosion normally decreases, and as the temperature of the water is increased the dosage of phosphate to inhibit corrosion also increases.

On relatively corrosive waters at temperatures near the boiling point all corrosion cannot be stopped with phosphates alone, even when employing very high dosages of the phosphate. Our tests have indicated that with these very high dosages only partial protection can be obtained and there is localized corrosion which is very undesirable. The higher temperatures also produce a greater tendency toward scale formation where the water contains substantial amounts of calcium.

One of the objects of this invention is to provide new and improved corrosion inhibiting compositions.

A further object of the invention is to produce new and improved corrosion inhibiting compositions which are effective in preventing or retarding the corrosive effects of relatively corrosive waters on ferrous metals at relatively high temperatures.

Another object of the invention is to provide a new and improved method for inhibiting corrosion.

A still further object of the invention is to provide a new and improved method of inhibiting corrosion by a chemical treatment involving the utilization of relatively small amounts of corrosion inhibiting chemicals. Other objects will appear hereinafter.

In accordance with the invention new and improved corrosion inhibiting compositions are prepared by intimately mixing or blending a corrosion inhibiting phosphate with a compound containing a —CN group, preferably a complex inorganic cyanide, with or without the addition of binders, algicides, bactericides and/or other water treating chemicals. Especially good results have been obtained with sodium ferrocyanide, sodium nitroprusside ($Na_2Fe(CN)_5NO.2H_2O$), potassium ferrocyanide, sodium ferricyanide and/or potassium ferricyanide in conjunction with a polyphosphate.

In order to evaluate the invention tests were made on a readily corrodible ferrous metal, namely, SAE-1020 mild steel, under various conditions of temperature and water velocity. The water used was a 1:1 mixture of Chicago tap water and distilled water, to which had been added 10.0 grains per gallon of sodium chloride. This water without treatment was very corrosive. When the water was treated with a polyphosphate such as sodium acid pyrophosphate ($Na_2H_2P_2O_7$), or a molecularly dehydrated polyphosphate such as $Na_9P_7O_{22}$, known as glassy septaphosphate, good protection against corrosion was obtained at 75 degrees F. with relatively small amounts of the phosphate. At 150 degrees F. relatively high dosages were required in order to inhibit corrosion. At 180 degrees F. all corrosion could not be stopped even when very high dosages of phosphate were added. At this temperature and with these high dosages only partial protection could be obtained. This caused undesirable localized corrosion. The addition of a cyanide alone to the corrosive water could not inhibit corrosion, but the utilization of the phosphate in conjunction with a cyanide was effective in inhibiting the corrosion even at temperatures above 180 degrees F.

The invention will be further illustrated but is not limited by the following examples, in which the quantities are stated in parts by weight unless otherwise indicated.

EXAMPLE I

A

A corrosive water was prepared as previously described by mixing Chicago tap water and distilled water in the ratio of 1:1 by weight and then adding 10.0 grains per gallon of sodium chloride. This water was then used in various tests on SAE-1020 mild steel. The tests were conducted by mounting a rod of SAE-1020 mild steel in a non-conducting mounting of Bakelite or rubber on a variable speed electric motor with the other end of the rod in the water to be tested. The velocity of the water can then be determined from the diameter of the rod and the speed at which the rod is turned by the motor. The water can be heated in any suitable manner to any desired temperature and maintained at that temperature. After each test the amount of corrosion can be determined by chemical analysis of the water for iron and by visual observation. Both methods were used in evaluating the results hereinafter set forth.

The following table shows the dosage in grains per gallon of $Na_2H_2P_2O_7$ required for corrosion prevention of SAE-1020 mild steel under various conditions of temperature and water velocity.

Table

| Water Velocity Ft./Sec. | Temperature Degrees F. | | | |
|---|---|---|---|---|
| | 75 | 150 | 180 | 210 |
| 0 | 5.0 | 10.0 | >15.0 | >30.0 |
| 0.1 | 1.5 | >6.0 | >10.0 | >15.0 |
| 0.3 | 0.5 | 4.0 | >5.0 | >15.0 |
| 1.9 | 0.4 | 2.0 | >6.0 | >15.0 |
| 3.2 | 0.3 | >6.0 | 15.0 | >15.0 |

> Indicates amount used was not sufficient to prevent all corrosion.

It will be observed that at 75 degrees F. good corrosion protection could be obtained with relatively small amounts of the phosphate. At 150 degrees F. quite high dosages were required but corrosion was inhibited by using the dosages shown. At 180 degrees F. and 210 degrees F. all corrosion could not be stopped even when very high dosages of the sodium acid pyrophosphate were employed except in one instance when the water velocity and dosage (15.0) were high. The use of such high dosages at these high temperatures is not only expensive but also causes other undesirable operating conditions such as sludge formation. Similar results were obtained with other phosphates, such as glassy septaphosphate. The use of cyanide compounds alone, such as sodium or potassium ferro or ferricyanides, or sodium cyanide, did not substantially inhibit corrosion.

B

At a flow rate of 1.9 feet per second and 180 degrees F., using the same test conditions described under A, no corrosion was obtained when the water was treated with 1.0 grain per gallon of $Na_9P_7O_{22}$ glassy septaphosphate and 0.1 grain per gallon of potassium ferrocyanide.

EXAMPLE II

The testing equipment described in Example IA was employed with a water temperature of 210 degrees F. and a velocity of 1.9 feet per second. No corrosion was obtained when a blend of 4.0 grains per gallon of $Na_2H_2P_2O_7$ and 0.5 grain per gallon of potassium ferrocyanide was added to the water.

EXAMPLE III

Tests made in the manner described under Example IA showed that 3.0 grains per gallon of $Na_9P_7O_{22}$ glassy septaphosphate and 0.2 grain per gallon of sodium cyanide (NaCN) gave very good corrosion protection at a temperature of 180 degrees F. and 1.9 feet per second velocity.

EXAMPLE IV

This example illustrates the preparation of a corrosion inhibiting composition suitable for the practice of the invention. This composition was prepared by pulverizing and blending together the following ingredients:

| Ingredient: | Parts by weight |
|---|---|
| Sodium ferrocyanide | 7 |
| Glassy septaphosphate | 50 |
| Anhydrous tetrasodium pyrophosphate | 28 |
| Soda ash | 15 |

The resultant pulverized composition can be added directly to the water to be treated.

EXAMPLE V

A ball briquette was prepared by briquetting the composition consisting of the following ingredients:

| Ingredient: | Parts by weight |
|---|---|
| Sodium ferrocyanide | 7 |
| Glassy septaphosphate | 50 |
| Anhydrous tetrasodium pyrophosphate | 27 |
| Ligno-sulfite binder (Bindarene) | 8 |
| Water | 8 |

This composition can be used in a ball feeder for the treatment of water.

From the foregoing and many other tests it is apparent that the dosage of the cyanide need not be very high to exert a very marked effect in corrosion protection. The optimum amount of the cyanide is usually within the range of 0.05 to 0.5 of the phosphate, and very good results have been obtained when the amount of cyanide is around 0.33 of the amount of phosphate by weight. In terms of grains per gallon of water treated the ratio of phosphate is preferably within the range of 0.1 grain per gallon to 5 grains per gallon, and the ratio of cyanide is preferably within the range of 0.05 grain per gallon to 0.5 grain per gallon. Very excellent results have been obtained when only 0.1 grain per gallon of potassium ferrocyanide was added along with the phosphate.

The invention is not limited to the use of any particular type of corrosion inhibiting phosphate. If the temperature of the water treated is low and the calcium content is low orthophosphates can be used, as, for example, trisodium phosphate, monosodium dihydrogen phosphate and disodium monohydrogen phosphate. For overall purposes and at higher temperatures the use of a polyphosphate is preferred, including, for example, one or more of the following phosphates: sodium acid pyrophosphate, tetrasodium pyrophosphate, sodium tripolyphosphate ($Na_5P_3O_{10}$), sodium tetraphosphate ($Na_4P_6O_{13}$), calcium acid pyrophosphate, sodium trithiotetraphosphate ($Na_6P_4O_{10}S_3$)

any of the water soluble polyphosphate glasses or so-called molecularly dehydrated phosphates in which the ratio of $Na_2O$ to $P_2O_5$ may be variable, including sodium hexametaphosphate and the glassy septaphosphate, as well as complexes containing calcium-sodium, magnesium-sodium and aluminum-sodium complexes.

All of the common inorganic cyanide compounds which were tried were found to be effective for the purpose of the invention, thus indicating that at least a partial reason for the improved results may be attributed to the cyanide (CN) radical. Stearyl nitrile, although substantially water insoluble, was also found to be effective.

Throughout the specification and claims it will be understood that the expression "at a temperature near the boiling point" as applied to the water being treated is intended to include temperatures of at least about 180 degrees F.

In the tests which have been made to evaluate the invention neither the phosphates alone nor the cyanides alone were effective in providing adequate corrosion protection at temperatures near the boiling point of water, whereas the combination of both was surprisingly effective. This improvement in the effectiveness could not have been predicted from the existing knowledge of the chemistry and the behavior of these chemicals. The invention, therefore, provides new and useful water treating compositions which are effective in preventing corrosion over a wide range of temperature, and in waters that are normally very corrosive when not treated. The invention has important advantages in providing a method of protection against corrosion by the addition of relatively small amounts of substances which do not cause other undesirable operating conditions. The use of such relatively small amounts has the added advantage of reducing the cost of corrosion protection. Thus, it has been demonstrated in Example IB that adequate corrosion protection at 180 degrees F. can be obtained with as little as 1.0 grain per gallon of glassy septaphosphate in conjunction with 0.1 grain per gallon of potassium ferricyanide, whereas, as shown by Table I, without the addition of the cyanide, at the same water velocity the polyphosphate used did not give adequate corrosion protection when 6 grains per gallon were employed at 180 degrees F.

*In corrosion tests of the type previously described, it is conventional to use a 24-hour test period.*

Having thus described the invention, what we claim is new and desire to secure by Letters Patent of the United States is:

1. A corrosion inhibiting composition comprising essentially a water soluble polyphosphate and a water soluble inorganic complex cyanide, the ratio of said cyanide to said phosphate being within the range of 0.05 to 0.5 by weight of said phosphate, and said composition being capable of dissolving in water to give a dissolved phosphate concentration within the range of 0.1 grain per gallon to 5 grains per gallon of water and a dissolved cyanide concentration within the range of 0.05 grain per gallon to 0.5 grain per gallon of water.

2. A corrosion inhibiting composition comprising essentially a water soluble glassy polyphosphate and a water soluble inorganic complex cyanide, the ratio of said cyanide to said phosphate being within the range of 0.05 to 0.5 by weight of said phosphate, and said composition being capable of dissolving in water to give a dissolved phosphate concentration within the range of 0.1 grain per gallon to 5 grains per gallon of water and a dissolved cyanide concentration within the range of 0.05 grain per gallon to 0.5 grain per gallon of water.

3. A corrosion inhibiting composition comprising essentially a water soluble molecularly dehydrated phosphate and an alkali metal ferrocyanide, the ratio of said cyanide to said phosphate being within the range of 0.05 to 0.5 by weight of said phosphate, and said composition being capable of dissolving in water to give a dissolved phosphate concentration within the range of 0.1 grain per gallon to 5 grains per gallon of water and a dissolved cyanide concentration within the range of 0.05 grain per gallon to 0.5 grain per gallon of water.

4. A corrosion inhibiting composition comprising essentially approximately 7% of sodium ferrocyanide, approximately 50% of glassy septaphosphate, and approximately 27–28% of anhydrous tetrasodium pyrophosphate.

5. A method of inhibiting corrosion in water which is in contact with ferrous metals at temperatures above about 180 degrees F. which comprises essentially incorporating with the water so that both are present at the same time (1) a polyphosphate and (2) a water soluble inorganic complex cyanide, the quantity of said polyphosphate in said water being within the range of 0.1 grain per gallon to 5 grains per gallon of said water, and the quantity of said inorganic cyanide in said water being within the range of 0.05 to 0.5 by weight of said polyphosphate.

6. A method of inhibiting corrosion in water which is in contact with ferrous metals at temperatures above about 180 degrees F. which comprises incorporating with the water so that both are present at the same time (1) a polyphosphate and (2) a water soluble potassium ferrocyanide, the quantity of said polyphosphate in said water being within the range of 0.1 grain per gallon to 5 grains per gallon of said water, and the quantity of said ferrocyanide in said water being within the range of 0.05 to 0.5 by weight of said polyphosphate.

7. A method of inhibiting corrosion in water at temperatures above about 180 degrees F. which comprises incorporating with the water so that both are present at the same time (1) a polyphosphate and (2) a water soluble potassium ferrocyanide, the quantity of polyphosphate being within the range of 1 to 5 grains per gallon, and the quantity of potassium ferrocyanide being within the range of 0.1 to 0.5 grains per gallon, the ratio of said ferrocyanide to said polyphosphate being within the range of 0.05 to 0.5 by weight of the polyphosphate.

8. A corrosion inhibiting composition comprising essentially a water soluble polyphosphate from the group consisting of sodium acid pyrophosphate, tetrasodium pyrophosphate, sodium tripolyphosphate, sodium tetraphosphate, calcium acid pyrophosphate, sodium trithiotetraphosphate, sodium hexametaphosphate and glassy septaphosphate, and a cyanide from the group consisting of sodium ferrocyanide, sodium nitroprusside, potassium ferrocyanide, sodium ferricyanide, potassium ferricyanide, sodium cyanide and stearyl nitrile, the ratio of said cyanide to said polyphosphate being within the range of 0.05 to 0.5 by weight of said polyphosphate and said composition being capable of dissolving in water to give a dissolved polyphosphate concentration within the range of 0.1 grain per gallon to 5 grains per gallon of water and a dissolved cyanide concentration within the range of 0.05 grain per gallon to 0.05 grain per gallon of water.

9. A corrosion inhibiting composition comprising essentially a water soluble polyphosphate and sodium cyanide, the ratio of said cyanide to said polyphosphate being within the range of 0.05 to 0.5 by weight of said polyphosphate and said composition being capable of dissolving in water to give a dissolved polyphosphate concentration within the range of 0.1 grain per gallon to 5 grains per gallon of water and a dissolved cyanide concentration within the range of 0.05 grain per gallon to 0.5 grain per gallon of water.

10. A corrosion inhibiting composition comprising essentially a water soluble polyphosphate and stearyl nitrile, the ratio of said nitrile to said polyphosphate being within the range of 0.05 to 0.5 by weight of said polyphosphate and said composition being capable of dissolving in water to give a dissolved polyphosphate concentration within the range of 0.1 grain per gallon to 5 grains per gallon of water and a dissolved nitrile concentration within the range of 0.05 grain per gallon to 0.5 grain per gallon of water.

11. A method of inhibiting corrosion in water which is in contact with ferrous metals at temperatures above about 180 degrees F. which comprises essentially incorporating with the water so that both are present at the same time (1) a polyphosphate from the group consisting of sodium acid pyrophosphate, tetrasodium pyrophosphate, sodium tripolyphosphate, sodium tetraphosphate, calcium acid pyrophosphate, sodium trithiotetraphosphate, sodium hexametaphosphate and glassy septaphosphate and (2) a cyanide from the group consisting of sodium ferrocyanide, sodium nitroprusside, potassium ferrocyanide, sodium ferricyanide, potassium ferricyanide, sodium cyanide and stearyl nitrile, the quantity of said polyphosphate in said water being within the range of 0.1 grain per gallon to 5 grains per gallon of said water and the quantity of said cyanide in said water being within the range of 0.05 to 0.5 by weight of said polyphosphate.

12. A method of inhibiting corrosion in water which is in contact with ferrous metals at temperatures above about 180 degrees F. which comprises essentially incorporating with the water so that both are present at the same time (1) a water soluble polyphosphate and (2) sodium cyanide, the quantity of said polyphosphate in said water being within the range of 0.1 grain per gallon to 5 grains per gallon of said water and the quantity of sodium cyanide in said water being within the range of 0.05 to 0.5 by weight of said polyphosphate.

13. A method of inhibiting corrosion in water which is in contact with ferrous metals at temperatures above about 180 degrees F. which comprises essentially incorporating with the water so that both are present at the same time (1) a water soluble polyphosphate and (2) stearyl nitrile, the quantity of said polyphosphate in said water being within the range of 0.1 grain per gallon to 5 grains per gallon of said water and the quantity of stearyl nitrile in said water being within the range of 0.05 to 0.5 by weight of said polyphosphate.

NATIONAL ALUMINATE CORPORATION,

By P. W. EVANS,
*Vice-Pres.*

References Cited in the file of this patent or the original patent

UNITED STATES PATENTS

| Number | Name | Date |
|---|---|---|
| 1,926,265 | Darsey | Sept. 12, 1933 |
| 1,942,923 | Irion | Jan. 9, 1934 |
| 2,120,212 | Curtin | June 7, 1938 |
| 2,332,209 | Enquist | Oct. 19, 1943 |
| 2,337,856 | Rice et al. | Dec. 28, 1943 |